ELECTRONIC PACKAGE

Filed Feb. 11, 1965

Keith N. Johnson,
Frederick C. Ochsner,
Inventors.
Koenig, Senniger, Powers and Leavitt,
Attorneys.

United States Patent Office 3,336,433
Patented Aug. 15, 1967

3,336,433
ELECTRONIC PACKAGE

Keith N. Johnson, Cumberland, R.I., and Frederick C. Ochsner, Attleboro, Mass., assignors to Texas Instruments Incorporated, Dallas, Tex., a corporation of Delaware Filed Feb. 11, 1965, Ser. No. 431,860
2 Claims. (Cl. 174—52)

Figures 1, 2, 3:
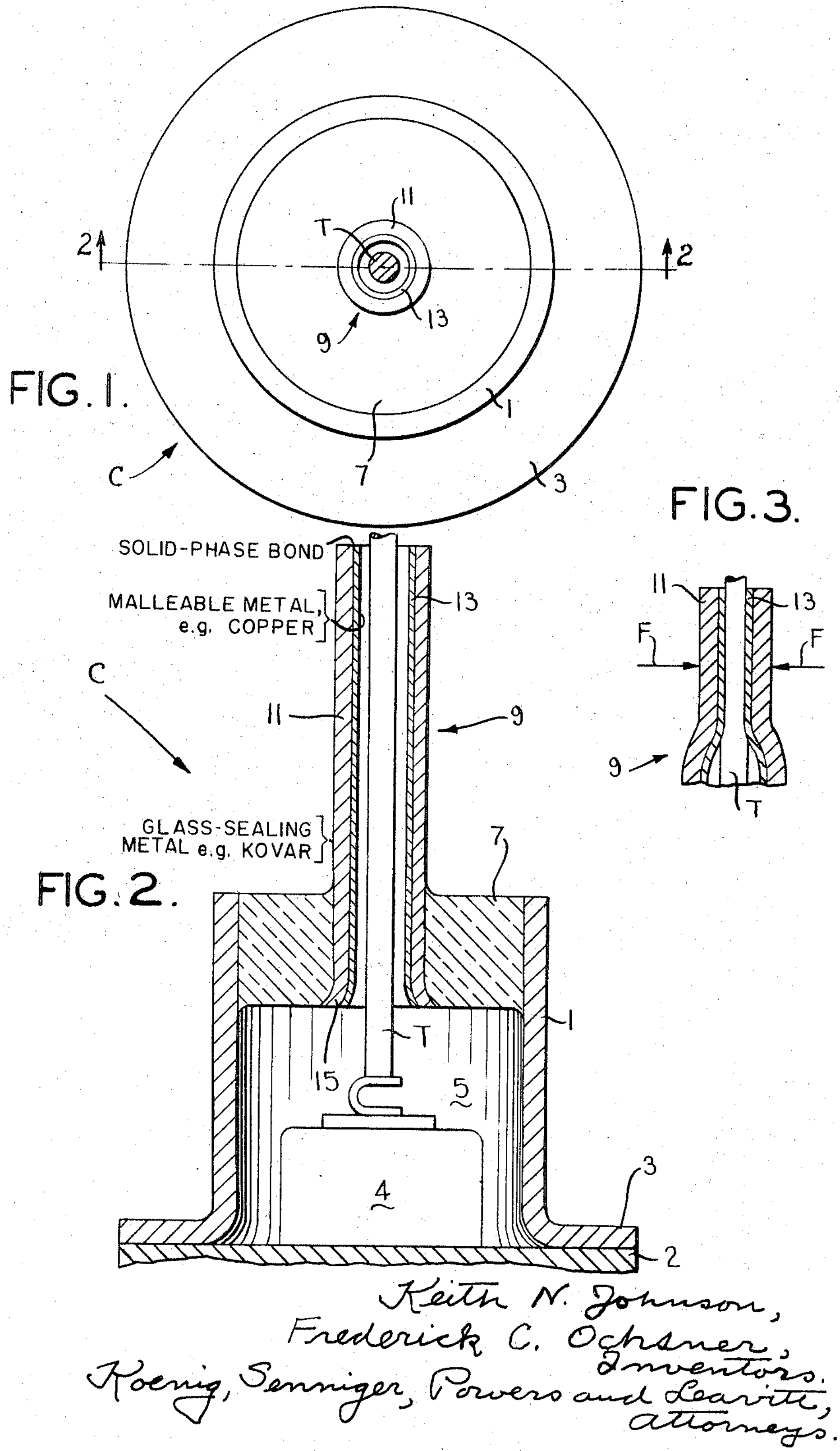

This invention relates to tubulations for closures of electronic packages, and with regard to certain more specific features, to tubulations for carrying conductive terminals through hermetic insulating seals of such closures of semiconductor packages and the like.

Among the several objects of the invention may be noted the provisions of a low-cost, accurately prepared and compact tubulation of high conductivity for extension through and compatability with a frangible sealant used in closures such as above described; the provision of such a tubulation which can be hermetically sealed around a conductor lead without damage either to the frangible seal or the often delicate electronic parts in the resulting package; and the provision of a tubulation of this class which avoids the former use of nonuniform outside coating on the tubulation such as heretofore caused undesirable variations in dimensions and also fouling of crimping dies. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which one of various possible embodiments of the invention is illustrated, FIG. 1 is a much-enlarged plan view of an unclosed cover for a typical electronic package employing the invention;

FIG. 2 is a cross section taken on line 2—2 of FIG. 1, certain parts in the package being shown diagrammatically; and FIG. 3 is a fragmentary sectional view illustrating the results of a closing operation.

Corresponding reference characters indicate corresponding parts throughout the several views of the drawings.

Packages for electronic devices are constructed with sealed enclosing components, one of which supports an electronic device to be packaged, such as for example a semiconductor device. One of the enclosing components, such as for example a cover, carries a frangible seal (glass, for example) through which extends one or more tubulations for carrying a terminal lead or leads for connecting the contained electronic device into a circuit. The enclosing components are bonded to one another to form a hermetically sealed package with the lead or leads extending therefrom.

The tubulations heretofore employed for carrying terminals through the glass, ceramic or like frangible seals have often been provided with tinned inner surfaces. This was to provide for a soldered connection with a terminal, or in some instances a crimped connection. The disadvantage of these former tubulations was that the only practical way of tinning the inner surfaces was by dipping the tubulations into molten tin or tin alloy. This also tinned the outer surfaces. Then if sealing was to be accomplished by crimping, the crimping devices tended to become fouled; and in any event, it was difficult to maintain accurate exterior dimensions of the tubulations, whether or not the final connections with the terminal were made by crimping or by soldering at soldering temperatures. When soldering was employed, there was a danger of forming contaminants which could enter the package so as deleteriously to affect the electronic contents of the package. Moreover, there was no assurance that the inside tinning of the tubulation would be uniform, a requirement for the most reliable internal sealing to the conductor terminal. The present invention provides for a tubulated package closure part having accurately formed sealing means which may be reliably sealed without danger of die fouling or contamination of the package contents and without the use of excessive heat, as is the case when soldering or liquid-phase welding techniques are employed.

The appended drawings, which are on a much-enlarged scale, show a typical but not the only type of closure element to which the invention is applicable.

Referring to the drawings, they show a cap-like form of closure component indicated generally at C. It has a metal sleeve 1, which may be composed, for example, of any suitable metal characterized in that it can provide a compatible, hermetically sealed interface with the sealant to be used, the latter usually being glass, ceramic, or both. Kovar is an example of such a metal and there are other typical ones such as Ni-Fe alloys and various steels known in the art. Kovar is a trade designation for an alloy having an A.S.T.M. designation F–15, which is composed of approximately 29% nickel, 17% cobalt and 53% iron, the remainder traces. Appropriate Ni-Fe alloys are one known as No. 52 which is composed of approximately 52% nickel, the balance iron; and one known as Invar which is substantially 36% nickel, the balance iron. A flange of the sleeve 1 is shown at 3, this being the means by which the closure C as a whole may be metallurgically bonded to a supporting base or the like 2 to enclose the electronic elements 4 to be contained in the resulting space 5. The elements 4 are only diagrammatically illustrated. The sealant is illustrated at 7 and is shown as composed of a dielectric such as glass, as for example, a borosilicate or soda lime glass. These and their like are generally frangible.

Our improved tubulation is shown in general at numeral 9. This is of prepared bimetal form, having an outer metal sleeve 11 and an inner metal liner sleeve 13. These sleeves are formed from metallurgically prebonded bimetallic stock. Prebonding has been accomplished preferably by one of the known low-temperature solid-phase bonding processes (see, for example, U.S. Patents 2,691,815 and 2,753,623). Such metallurgical bonding ensures a perfect hermetic seal between the bimetal layers constituting the tubulation 9. As shown at 15, the tubulation 9 may be flared, if desired, to facilitate feeding an appropriate terminal T through the tube from the inside space 5 when parts 2 and 3 are joined.

The metal of the outer sleeve 11 is formed of an alloy which, as in the case of the sleeve 1, will properly effect a seal with the glass 7, typical examples being F–15 alloy (sometimes called Kovar), Ni-Fe alloys which include No. 52 and Invar, or appropriate steel. The sleeve 11 should also be comparatively tough, that is, of less ductility or malleability, which is to say, somewhat harder than the sleeve 13. The inner sleeve 13 should be characterized by substantial ductility or malleability and high conductivity. Thus it has substantial ductile or cold-flow characteristics. It may, for example, be copper, silver, aluminum or other highly cold-flowable metal. Such metals have comparatively high coefficients of thermal expansion. Preferably the volume of material per unit of length of the inner sleeve 13 should be less than that of the outer sleeve 11 but may be varied up to but not more than a 50:50 ratio. The exact ratio depends upon the outside diameter of the tubulation 9, taken as a whole. The undesirability of a ratio in excess of 50:50 will appear.

Typical dimensions may, for example, be .060 inch for the outside diameter of sleeve 11 with a wall thickness of .008 inch; and .044 inch for the outside diameter of sleeve 13 where bonded to sleeve 11, the wall thickness of the inner sleeve 13 being .002. This provides a hole .040 inch in diameter for reception of a terminal T.

The material of the inner sleeve 13 is selected primarily for its high conductivity and malleability and that of the outer layers 11 for its toughness and a thermal expansion characteristic compatible with that of the glass 7. By not having the material of the inner layer 13 present in too great an amount, its higher coefficient of thermal expansion will not override the desirable effect of the comparatively lower coefficient of thermal expansion of the outer sleeve 11. Such override would favor undesirable expansion of the outer sleeve 11 incompatible with that of the glass 7.

The substantial malleability of the highly conductive inner liner sleeve 13 is of importance as is more clearly brought out below. When the component closure C as a whole is attached by means of its flange 3 to the base 2 or the like to cover the electronic parts 4 in space 5, the terminal T of such parts is pushed or threaded through the tubulation 9.

It will be understood that although one tubulation is shown in the drawings, in some cases several may pass through one glass seal 7 in some forms of closures.

A typical terminal is composed of so-called Dumet wire, which is 42% nickel alloy covered with copper and is a highly malleable or cold-flow material readily subject to cold pressure welding. An all-copper wire could also be suitable. Other wires may also be used completely of malleable metal such as copper, silver and aluminum, or at least having surfaces composed of such metals.

After a lead has been thus threaded through a tubulation, the latter is crimped by suitable crimping dies which apply reactive forces (see arrows F on FIG. 3), thereby squeezing the tubulation around and hermetically sealing the liner 13 to and around the terminal T by solid-phase bonding (see FIG. 3). The high cold-flow properties of the inner sleeve 13 and of the surface of terminal T favor this result under pressure attainable by means of the dies and effectively transmitted to the cold-flow material by the tougher or harder material of the outer sleeve 11. If desired, some warming may thereafter be employed, as known in the art, to improve the solid-phase bond, but this does not require a temperature which would adversely affect the glass seal, as might be the case with a soldering operation or a liquid-phase weld. Neither does the solid-phase pressure welding involve the production of any contaminants which might reach the interior space 5. It will also be seen that since the sleeves 11 and 13 have already been strongly metallurgically joined by solid-phase bonding before the forces F are applied, these sleeves will not separate under deformation during application of those forces.

In view of the above, it will be seen that by use of the bimetal tubulation many advantages are attained, as follows:

(1) A reliable seal is obtained between the outer surface of the sleeve 11 and the inner surface of the glass 7.

(2) The outer surface of the sleeve 11 is free of any soft material such as solder which might foul crimping dies required to produce the forces F.

(3) The comparatively soft inner sleeve 13 is dimensionally accurate throughout the tube length for good bonding to the terminal T, regardless of where the forces F are applied along its length. Crimping will not open the bond between sleeves 11 and 13. A good cold weld is obtained not only with the terminal T but also at any interfaces between flattened portions of the inner sleeve itself when crimped. No excessive heat is required to obtain the improved bond, as would be the case with liquid-phase welding or soldering and which might cause hot spots, distortion and contamination.

(4) The amount of material in the inner sleeve 13, being limited as above set forth, prevents the comparatively high coefficient of thermal expansion characteristics of sleeve 13 from overriding the lower ones of the outer sleeve 11 to any extent which would affect the good bond between the outer sleeve 11 and the glass 7.

(5) The toughness of the outer sleeve 11, being comparatively greater than that of the inner sleeve 13, is of advantage when the squeezing dies are applied, in that the outer sleeve material then acts as a backing for the softer material of the inner sleeve 13 to force it to flow completely around the terminal T. This is because the comparatively tough material of the outer sleeve 11 ensures adequate transmission of force from the dies to the inner sleeve for squeezing it, which would not occur so effectively if the outer sleeve itself were more malleable, with increased tendency to flow.

(6) In some cases, terminal T is not a continuous wire but may be interrupted by the use of two separate terminals which meet within area F. This may present an electrical discontinuity within area F. In this case it is a considerable advantage to have inner sleeve 13 formed of a material with high electrical conductivity so that electrical transfer between the segments of terminal T is promoted.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electronic package comprising a container,
a dielectric seal forming part of the container,
an electronic element in the container,
a conductive terminal connected with said electronic element and extending from the container through said seal, said terminal having a ductile surface,
a composite tubulation through which is fed said terminal and which surrounds it, said tubulation being in sealed contact with said seal, said tubulation extending from the inside of the container to an extent from the outside of the seal to provide for an external crimping of the tubulation on said terminal,
said tubulation including an outer sleeve composed of a metal having a thermal coefficient of expansion which is compatible with that of the seal,
an inner metal sleeve solid-phase bonded to the outer sleeve substantially throughout the length of the outer sleeve including that part in contact with the seal, said tubulation being formed with an inward crimp on and around said terminal, said inner sleeve being ductile and having a cold-flow, solid-phase bond with the ductile surface of said terminal within the crimp,
the ductility of said outer sleeve being substantially less than that of the inner sleeve to establish the pressure on the inner sleeve at the crimp required for said cold-flow, solid-phase bond between the inner sleeve and the ductile surface of the terminal,
the volume per unit of length of material of the inner sleeve being approximately not more than the volume per unit of length of the outer sleeve, so that any excess of thermal expansion of the inner sleeve over that of the outer sleeve does not affect the expansion of the outer sleeve sufficiently to interfere with said compatibility between the expansion of the outer sleeve and that of said dielectric seal.

2. A package according to claim 1, wherein said dielectric seal is composed of material selected from the group consisting of glass and ceramic,
said outer sleeve is composed of a metal selected from the group consisting of steel; an alloy composed of approximately 29% nickel, 17% cobalt and 53% iron, the remainder traces; an alloy composed of approximately 52% nickel, the balance iron; and an alloy composed of approximately 36% nickel and the balance iron, and said ductile inner sleeve is composed of a metal selected from the group consisting of copper, silver and aluminum.

References Cited

UNITED STATES PATENTS

| | | | |
|---|---|---|---|
| 1,083,070 | 12/1913 | Eldred | 287—189.365 |
| 2,669,702 | 2/1954 | Klostermann. | |
| 2,964,830 | 12/1960 | Henkels et al. | 317—234 X |
| 3,203,083 | 8/1965 | Obenhaus | 29—470.1 |

LARAMIE E. ASKIN, *Primary Examiner.*